(12) United States Patent
Hempel et al.

(10) Patent No.: US 11,581,116 B2
(45) Date of Patent: Feb. 14, 2023

(54) METHOD FOR TRANSFERRING DATA FROM AN ACTUATING ELEMENT TO A CONTROL UNIT, CORRESPONDING ACTUATING ELEMENT AND CORRESPONDING CONTROL UNIT

(71) Applicant: Robert Bosch GmbH, Stuttgart (DE)

(72) Inventors: Andreas Hempel, Ludwigsburg (DE); Andreas Kneer, Koengen (DE); Armin Mann, Sachsenheim (DE); Bernd Wichert, Kernen (DE); Dieter Elshuber, Attnang-Puchheim (AT); Dieter Schuler, Stuttgart (DE); Markus Ditlevsen, Stuttgart (DE); Yannick Chauvet, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 17/241,803

(22) Filed: Apr. 27, 2021

(65) Prior Publication Data

US 2021/0358669 A1 Nov. 18, 2021

(30) Foreign Application Priority Data

May 13, 2020 (DE) .......................... 102020206002.9

(51) Int. Cl.
*H02H 1/00* (2006.01)
*H01F 7/06* (2006.01)
*G05B 19/042* (2006.01)

(52) U.S. Cl.
CPC ......... *H01F 7/064* (2013.01); *G05B 19/0426* (2013.01); *G05B 2219/25257* (2013.01)

(58) Field of Classification Search
None
See application file for complete search history.

(56) References Cited

U.S. PATENT DOCUMENTS 6,166,872 A * 12/2000 Uno .................... G11B 5/09
2008/0049829 A1 * 2/2008 Schauer ............ H04B 14/023
375/238

* cited by examiner

*Primary Examiner* — Stephen W Jackson
(74) *Attorney, Agent, or Firm* — Norton Rose Fulbright US LLP; Gerard Messina

(57) ABSTRACT

A method for transferring data from an actuating element to a control unit activating the actuating element. The control unit activates an inductance contained in the actuating element, for the transfer of the data in the actuating element in parallel to the inductance, a load being connected in parallel, or not.

13 Claims, 2 Drawing Sheets

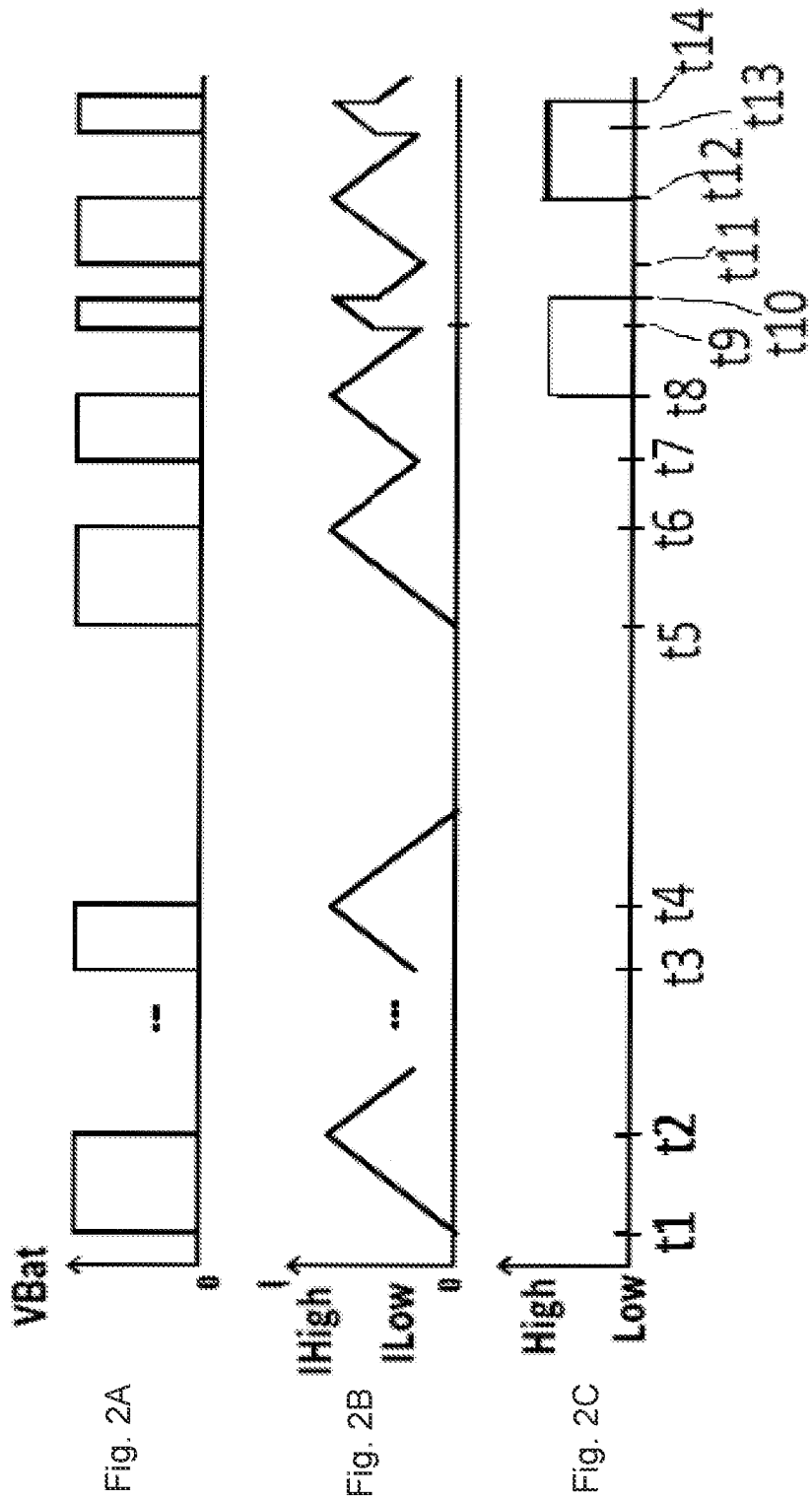

METHOD FOR TRANSFERRING DATA FROM AN ACTUATING ELEMENT TO A CONTROL UNIT, CORRESPONDING ACTUATING ELEMENT AND CORRESPONDING CONTROL UNIT

CROSS REFERENCE

The present application claims the benefit under 35 U.S.C. § 119 of German Patent Application No. DE 102020206002.9 filed on May 13, 2020, which is expressly incorporated herein by reference in its entirety.

BACKGROUND INFORMATION

The present invention is directed to a method for transferring data from an actuating element to a control unit and to a corresponding actuating element and a corresponding control unit according to the definition of the species in the independent patent claims. For conventional actuating elements, the properties are ascertained at the end of a production and applied, as corresponding data, on the outer side of the actuating element with the aid of a dot matrix. During a start-up, the corresponding data are then read out of the dot matrix by a technician and transferred into a control unit.

SUMMARY

A method according to an example embodiment of the present invention and the actuating element or control unit according to example embodiments of the present invention may have the advantage over the related art that an automated transfer of the data from the actuating element to the control unit takes place via electrical signals. Therefore, it is no longer necessary to read out a dot matrix and transfer it into the control unit. As a result, in particular, manual working steps may be avoided during the assembly of actuating elements and control units.

Further advantages and improvements result from the disclosure herein. A particularly simple activation of the actuating element takes place via a regulation of the current flow through the inductance of the actuating element by the control unit. During the transfer of the data from the actuating element to the control unit, the regulation of the current flow takes place to a value that is lower than the value necessary for an actuation of the actuating element. In this way, an unintentional actuation of the actuating element is avoided. The current regulation of the control unit may also be utilized, particularly easily, for evaluating the data sent from the actuating element to the control unit. Therefore, no separate software or hardware needs to be provided for evaluating the data. The length of the voltage pulse of the control unit set via the regulation may be particularly easily determined. The transfer of the data is particularly easily requested by the control unit with the aid of an unambiguous signal. The data transferred from the actuating unit are utilized by the control unit, in particular, for activating the actuating element. In this way, production variations of the actuating element may be taken into account during the activation of the actuating element. The corresponding data are particularly easily ascertained during a production of the actuating element.

BRIEF DESCRIPTION OF THE DRAWINGS

Exemplary embodiments of the present invention are represented in the figures and are explained in greater detail in the description below.

FIGS. 2A-2C show various electrical signals, which are exchanged between the control unit and the actuating element, in accordance with an example embodiment of the present invention.

DETAILED DESCRIPTION OF EXAMPLE EMBODIMENTS

Figure 1:
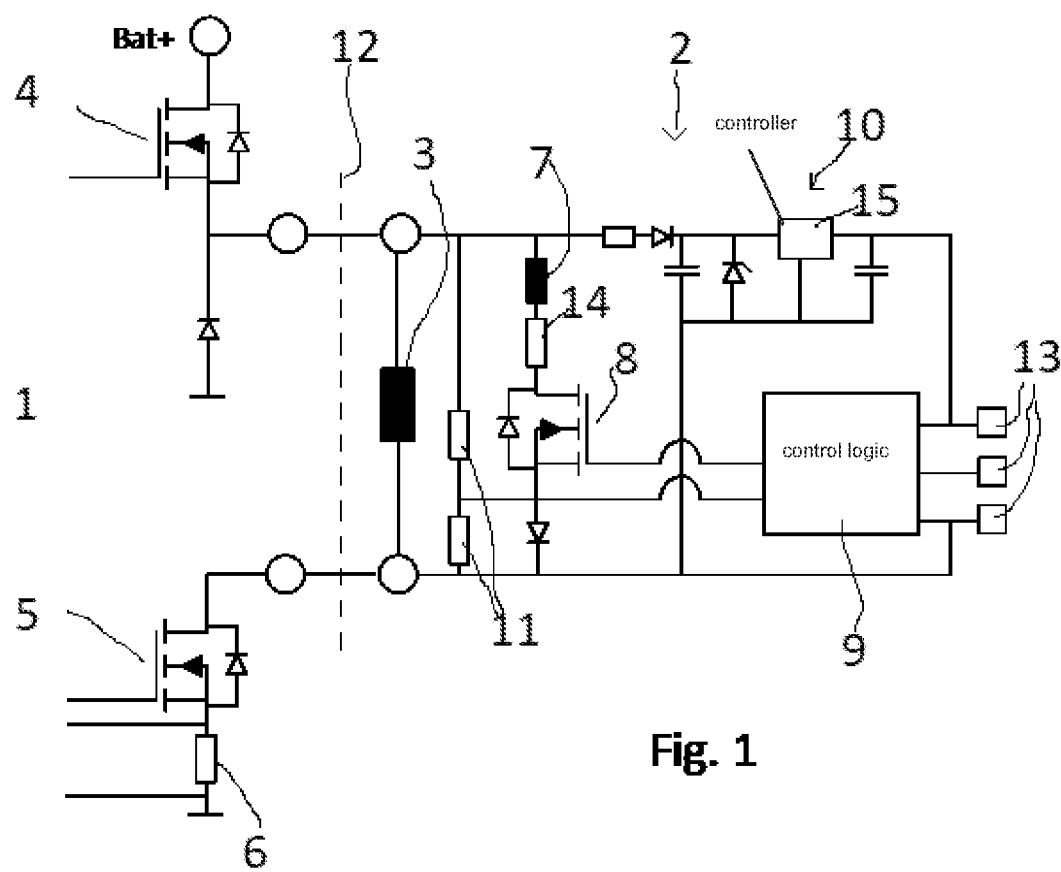
FIG. 1 shows a schematic diagram of the control unit and of the actuating element, according to an example embodiment of the present invention.

In FIG. 1, a control unit 1 and an actuating element 2 are schematically represented, only the relevant electronic components of control unit 1 and of actuating element 2 being represented. In the representation from FIG. 1, the components of control unit 1 are represented to the left of dashed dividing line 12 and the components of actuating element 2 are represented to the right of dashed dividing line 12. Actuating element 2 is an actuating element, which includes an inductance 3. Such an inductance 3 may be, for example, a coil of an electromagnetic actuator. When this coil is closed by a sufficiently strong current, it generates a force action onto a soft magnetic element, by way of which a movement is carried out. Such actuators are utilized, for example, as valves for the metered injection of liquids.

The activation of inductance 3 takes place via control unit 1, in that a current flow through inductance 3 is controlled. For this purpose, control unit 1 includes a switch 4, which is designed as a MOSFET and is connected, on the one side, to a positive battery voltage and, on the other side, to a first terminal of inductance 3. Moreover, control unit 1 includes a second switch 5 designed as a MOSFET, via which a second terminal of inductance 3 may be connected to ground via a measuring resistor 6. When switch 4 and switch 5 are controlled in a conductive state via a control logic (not represented) of control unit 1, a current flow through inductance 3 is controlled via the potential difference between the battery voltage and ground. A voltage drop across resistor 6 may be measured upstream and downstream from measuring resistor 6 via a measuring line and, in this way, the current flow may be determined, which flows across resistor 6 and, thereby, also through inductance 3. Control unit 1 may, for example, contain a microcontroller including an appropriate programming as control logic, which controls a desired current through inductance 3 as a function of operating conditions. In this way, control unit 1 is capable of controlling desired actions of actuating element 2.

Production-induced variations of the properties of actuating element 2 are problematic for such a control of actuating element 2 by a control unit 1. In order to compensate for such variations, it is desirable for an activation of actuating element 2 that information regarding the variation of the properties of actuating element 2 is known in control unit 1. During a production of actuating element 2, the properties of actuating element 2 may be ascertained at the end of the production and utilized for a control of the current through inductance 3. In FIG. 1, actuating element 2 includes a control logic 9 for this purpose, which internally contains a memory, in which such information regarding the variations of the properties of the actuating element is stored. Moreover, actuating element 2 includes further means, which allow for a transfer of the information stored in control logic 9 back to control unit 1.

A load 7 is situated in a series connection including a switch 8 in parallel to inductance 3. Load 7 may therefore be connected in parallel to inductance 3 by conductively switching switch 8. Moreover, a resistor 14 is also provided in series with load 7 and switch 8, which is utilized for adjusting the resistance of the series connection of load 7 and switch 8. Switch 8 is preferably designed as a MOSFET and is activated by control logic 9 with the aid of an activation line. Due to an appropriate signal of control logic 9, switch 8 may be brought into a conductive state or into a non-conductive state. Moreover, a voltage divider including two resistors 11 is situated in parallel to inductance 3. An electrical connection to control logic 9 is provided between the two resistors 11, by way of which control logic 9 may check a voltage level. When the two switches 4, 5 of control unit 1 are in a conductive state, a potential difference is applied at inductance 3. Since the two resistors 11 are connected in parallel to inductance 3, the line situated between the two resistors 11 will also have a voltage level. When one or both switch(es) 4, 5 is/are in a non-conductive state, the line situated between the two resistors 11 will not have a voltage. Control logic 9 may therefore establish, by querying this line between the two resistors 11, whether control unit 1 activates inductance 3, or not.

Moreover, actuating element 2 also includes a voltage supply 10, which, in addition to a controller 15, also includes a few capacitors for stabilizing the controlled voltage. Due to voltage supply 10, a sufficient voltage supply for control logic 9 is ensured, provided that a voltage signal is sufficiently frequently applied at actuating element 2 by control unit 1. Due to voltage supply 10, a supply voltage for control logic 9 is ensured, even though a voltage signal is not applied by control unit 1 at actuating element 2 for a short time.

Moreover, control logic 9 also includes three external terminals 13, which are utilized for an external programming or storage of data. For this purpose, the information regarding properties of actuating element 2 ascertained in a production of actuating element 2 is stored, via terminals 13, in control logic 9. A supply voltage is applied at one of terminals 13, a grounding is applied at another terminal 13, and the appropriate data signals are applied at further terminal 13.

The mode of operation of the individual components and the interaction between control unit 1 and actuating element 2 are explained with reference to the signal profiles from FIGS. 2A-2C. In FIG. 2A, the voltage applied by control unit 1 at inductance 3 is plotted with respect to time. When both switches 4, 5 of control unit 1 are conductive, a potential difference at the level of the supply voltage is applied at inductance 3. In FIG. 2B, the current flow in inductance 3 effectuated by the potential difference is plotted with respect to time. In FIG. 2C, the control signals of control logic 9 at switch 8 are shown over time. When the signal from FIG. 2C has a "low" level, switch 8 is open, i.e., non-conductive. When the signal from FIG. 2C has a "high" level, switch 8 is closed, i.e., conductive and, thereby, load 7 is connected in parallel to inductance 3.

In the course of time from FIGS. 2A-2C, no activation takes place before point in time t1. At point in time T1, the two switches 4, 5 of control unit 1 are both conductively controlled and, in this way, a potential difference at the level of VBat is applied at inductance 3. The activation may take place simultaneously at both switches 4, 5 or, however, one of the two switches 4, 5 may already be conductive and then the other switch is switched. Usually, switch 5, by way of which a connection to earth or ground is established, is always conductively switched, in order to continuously have a connection to earth or ground. An activation then takes place exclusively by conductively or non-conductively switching switch 4.

The control unit evaluates the current flow through measuring resistor 6, which is shown in the temporal profile of FIG. 2B. The current flow through inductance 3 starts from a non-existent current flow and increases over time. As soon as the current flow at point in time T2 has reached a value of IHigh, switch 4 is opened again and, then, a potential difference is no longer present at inductance 3. After point in time T2, the current flow through inductance 3 therefore drops again and is observed by control unit 1 via evaluation at measuring resistor 6. As soon as the current flow through inductance 3 has reached a value ILow, switch 4 is conductively connected again. The value of ILow is not zero, but rather has a value above zero. Such a reactivation of switch 4, starting from current value ILow through inductance 3, is shown between points in time T3 and T4. Since the current flow through the inductance is not zero at point in time T3, but rather has a value of ILow, the current flow through inductance 3 will reach value IHigh again considerably faster than in time window T1 through T2. The temporal length of period of time T3 through T4 is therefore shorter than period of time T1 through T2.

Due to control unit 1, a current regulation takes place, by way of which the current through inductance 3 is regulated to a setpoint value between values ILow and IHigh. During a normal operation, in which an actuation of an actuating element is desired, the current through inductance 3 is regulated in such a way that an actuation of actuating element 2 is associated therewith. In particular, when the actuating element is designed as an electromagnetic actuator, a sufficiently high magnetic field is generated by the current flow through inductance 3 designed as a coil, in order to move a magnetic control member or to generate an appropriate force action. In the method according to the present invention, however, no actuation of actuating element 2 is necessary, so that the current flow through inductance 3 is preferably regulated for operating phase T0 through T4 in such a way that an actuation of actuating element 2 is not associated therewith. Phase T0 through T4 is then provided only for signaling to actuating element 2 or control logic 9 in actuating element 2 that a transfer of the data from actuating element 2 to control unit 1 is to subsequently take place. For this purpose, in time phase T0 through T4, the applied voltage level must be selected with respect to its temporal length in such a way that such a pattern cannot occur during a normal operation. Since control logic 9 may detect such a pattern by evaluating the signals at the voltage divider of resistors 11, control logic 9 may detect the desired transfer of the data stored in control logic 9.

This period of time T1 through T4 is then followed by a further period of time T4 through T5, in which no application of potential differences at inductance 3 takes place. This phase T4 through T5 was also utilized for signaling to control logic 9 that a transfer of data from control logic 9 to control unit 1 is to take place. A learning phase then takes place, in which the temporal length of voltage signals 2A of control unit 1 is learned, as a function of which load 7 is connected in parallel to inductance 3, or not. In a first phase between points in time T5 through T6, the current flow through inductance 3 is initially brought to a value IHigh again. Since, at point in time T0, the current took place starting from no current flow, this period of time T5 through T6 is extended again between current values ILow and IHigh as compared to a normal operation. In time window T6 through T7, no voltage is applied at inductance 3, so that the current drops to value ILow again. At point in time T7, the potential difference is applied at inductance 3 again, so that the current through inductance 3 rises to value IHigh again between T7 and T8. At point in time T8, i.e., at the falling edge of voltage signal from FIG. 2A, switch 8 is then conductively switched by control logic 9, as the result of which additional load 7 is connected in parallel to inductance 3. This initially has no effect on the reduction of the current flow through inductance 3 up to point in time T9 where the voltage is applied again due to reaching current value ILow.

At this point in time, however, a current flows not only through inductance 3, but rather, simultaneously, also through load 7 connected in parallel. This is noticeable due to the fact that a considerably higher current is apparently measured at measuring resistor 6. The profile of the current, as it is shown in FIG. 2B, therefore shows an abrupt jump up to a higher level at point in time T9. Starting from this higher level, current value IHigh is reached in a considerably shorter time and the current regulation of control unit 1 responds appropriately by switching off the potential difference at inductance 3. As is apparent from considering FIG. 2A, the parallel connection of load 7 has therefore effectuated a considerably reduced time period of the voltage signal of FIG. 2A applied via the current regulation. By evaluating the voltage signals of FIG. 2A, it is therefore possible for control unit 1 to establish whether load 7 was connected in parallel to inductance 3, or not, by control logic 9. This is then subsequently utilized for transferring data from control logic 9 to control unit 1.

At point in time T9, control unit 1 had therefore learned the temporal length of the signals, which depend on whether load 7 is connected in parallel to inductance 3, or not.

In order to transfer a low bit, switch 8 is opened again at point in time T10, so that voltage is applied by control unit 1 only to inductance 3. As a result, in period of time T10 through T12, a normally long voltage level is required for charging inductance 3. At point in time T12, a high bit is then transferred by control logic 9, in that switch 8 is closed and, therefore, conductively switched, at point in time T12. This results in a considerably shorter voltage signal by control unit 1, which is shown by period of time T13 through T14. Control unit 1 may therefore unambiguously differentiate the high bit and the low bit sent by control logic 9. Alternatively to the temporal length of the high level of FIG. 2A, the signal of FIG. 2A may also be considered from falling edge to falling edge. The voltage profile of FIG. 2A in time window T10 through T12 is one-third low and two-thirds high and, in time window T12 through T14, two-thirds low and one-third high. The different switching states of switch 8 may also be detected in this way.

The method according to the present invention may be utilized, in particular, when certain properties of actuating element 2 deviate from one another due to variations in the production. For example, actuating element 2 may be designed as a valve for injecting a liquid and the amount of liquid injected by the valve may vary at identical applied control signals due to production variations. Such a variation of the valve could then be detected at the end of a production with the aid of test injections and appropriate measurements, and appropriate parameters, which describe this, are then stored in logic circuit 9. For this purpose, logic circuit 9 includes external terminals 13, by way of which a start-up of logic component 9 may take place and, in this way, a programming of appropriate measured data may take place. When actuating element 2 is then operated together with a control unit 1, a transfer of these data stored in control logic 9 would then take place either during an initial start-up or, however, also from time to time during on-going operation. In this way, negative effects due to production variations during the manufacture of the actuating elements may be avoided.

What is claimed is:

1. A method for transferring data from an actuating element to a control unit which activates the actuating element, the method comprising:
    activating, by the control unit, an inductance contained in the actuating element;
    applying, by the control unit, a signal to the actuating element to prompt the actuating element to transmit data stored in a control logic of the actuating element to the control unit;
    detecting, by the control logic of the actuating element at an input to the control logic, the signal; and
    selectively connecting or not connecting, by the control logic of the actuating element in response to detecting the signal, a load of the actuating element in parallel to the inductance, for the transfer of the data stored in the control logic of the actuating element to the control unit.

2. The method as recited in claim 1, wherein a current flow in the inductance is regulated to a predetermined value by the control unit.

3. The method as recited in claim 2, wherein the inductance is a coil of an electromagnetic actuator and, during the transfer of the data, a current flow in the inductance is regulated by the control unit to a value, which is lower than a value for a current flow for an actuation of the actuating element.

4. The method as recited in claim 2, wherein the regulation of the current flow through the inductance is affected by the connection of the load in parallel, in that a length of a voltage pulse, which is applied by the control unit at the inductance in order to regulate the current flow through the inductance, is changed.

5. The method as recited in claim 4, wherein, before the transfer of the data, the length of a voltage pulse is determined with the load connected in parallel and without the load connected in parallel.

6. The method as recited in claim 1, wherein the data includes information regarding properties of the actuating element stored in the control logic, and the control unit utilizes the transferred data for activating the actuating element.

7. The method as recited in claim 6, wherein the information regarding properties of the actuating element were ascertained during a production of the actuating element by measuring the properties of the actuating element.

8. An actuating element, comprising:
    an inductance; and
    control logic configured to connect a load in parallel to the inductance, or not connect the load, in order to transfer data stored in the control logic to a control unit which is configured to activate the actuating element, wherein the control logic includes an input to detect a signal applied by the control unit to the actuating element to prompt the actuating element to transfer the data, and connect or not connect the load in parallel to the inductance for the transfer of the data in response to detecting the signal.

9. A control unit for activating an actuating element the control unit configured to:
    activate an inductance of the actuating element;
    apply a signal to the actuating element to prompt a control logic of the actuating element to send data stored in the control logic to the control unit; and detect a connection or non-connection of a load, in the actuating element, in parallel to the inductance and, in this way, receive data sent by the actuating element.

10. The method as recited in claim 1, wherein the signal includes a predetermined pattern.

11. The method as recited in claim 10, wherein the predetermined pattern does not occur during an actuating operation of the actuating element.

12. The method as recited in claim 1, further comprising receiving, at a second input to the control logic of the actuating element, a data signal representing the data stored by the control logic.

13. The method as recited in claim 1, further comprising:
receiving, by a voltage supply of the actuating element, a voltage during the activating by the control unit the inductance of the actuating element; and
providing, by the voltage supply to the control logic of the actuating element, a supply voltage to power the control logic.

* * * * *